United States Patent [19]

Menon et al.

[11] Patent Number: 5,334,567
[45] Date of Patent: Aug. 2, 1994

[54] COCATALYST FOR VANADIUM-CONTAINING ETHYLENE POLYMERIZATION CATALYST

[75] Inventors: Raghu Menon, West Chester; Albert P. Masino, Hamilton; Mark K. Reinking, Mason, all of Ohio

[73] Assignee: Quantum Chemical Corporation, Cincinnati, Ohio

[21] Appl. No.: 10,740

[22] Filed: Jan. 29, 1993

[51] Int. Cl.$^5$ .............................................. B01J 31/00
[52] U.S. Cl. ................................ 502/116; 502/113; 502/115; 502/119; 502/120; 526/129
[58] Field of Search ............... 502/113, 115, 116, 119, 502/120

[56] References Cited

U.S. PATENT DOCUMENTS

| | | |
|---|---|---|
| 3,786,032 | 1/1974 | Jennings et al. |
| 4,004,071 | 1/1977 | Aishima et al. |
| 4,250,287 | 2/1981 | Matlack. |
| 4,530,913 | 7/1985 | Pullukat et al. |
| 4,559,318 | 12/1985 | Smith et al. |
| 4,611,038 | 9/1986 | Brun et al. |
| 4,806,433 | 2/1989 | Sasaki et al. ..................... 502/115 |
| 4,831,000 | 5/1989 | Miro. |
| 4,866,021 | 9/1989 | Miro et al. |
| 4,912,074 | 3/1990 | Miro. |
| 4,972,033 | 11/1990 | Miro. |
| 5,006,618 | 4/1991 | Miro. |
| 5,051,388 | 9/1991 | Buehler et al. ................... 502/113 |
| 5,104,949 | 4/1992 | Buehler et al. ................... 502/113 |

*Primary Examiner*—Helen M. S. Sneed
*Assistant Examiner*—E. D. Irzinski
*Attorney, Agent, or Firm*—William A. Heidrich

[57] ABSTRACT

The present invention is directed to a novel halosilane cocatalyst component which may be used in conjunction with an aluminum-containing cocatalyst to provide enhanced catalytic activity of a vanadium based solid catalyst component in the polymerization of $\alpha$-olefins. In addition to the enhancement in the catalytic activity obtaining using the present catalyst system, the resultant polymer produced by the present invention exhibits improved physical properties compared with polymers produced by prior art vanadium based catalyst systems. Thus, the catalyst system of the instant invention represents an advance in the art in view of the combination of increased catalytic activity, i.e. yield of polymer produced, and enhanced physical properties of the polyolefin produced.

In accordance with the present invention, a catalyst system is provided which comprises a solid catalyst component and a halosilane cocatalyst component. The solid catalyst component of the present invention is the product formed by admixing a solid inorganic oxide, an organometallic compound, a vanadium-containing compound and an organic reagent.

In another aspect of the present invention, a process of the polymerization of $\alpha$-olefins is disclosed. In this process at least one olefin is polymerized under olefin polymerization catalyst utilizing the catalyst system of the present invention, which includes the solid catalyst component of the present invention, and a cocatalyst selected from the group consisting of halosilane compounds and admixtures thereof with aluminum compounds.

16 Claims, No Drawings

COCATALYST FOR VANADIUM-CONTAINING ETHYLENE POLYMERIZATION CATALYST

FIELD OF INVENTION

The present invention relates to a highly active vanadium based polymerization catalyst system which comprises reacting a solid catalyst component with a cocatalyst selected from the group consisting of halosilane compounds and admixtures thereof with aluminum-containing compounds during the initial stages of polymerization of α-olefins. More specifically, the instant invention relates to a novel halosilane cocatalyst component which is effective in enhancing the activity of a vanadium based solid catalyst in the polymerization of ethylene. Further, the present invention also relates to the polymerization process utilizing the catalyst system and the polymers thus produced by the process.

DESCRIPTION OF PRIOR ART

Vanadium compounds have for some time been proposed for use in polymerization catalysts as an alternative for commonly used titanium based catalysts. Vanadium based catalysts, however, have had relatively little use on a commercial scale since the polymers produced therewith were produced at a relatively low level of catalyst activity and/or the catalysts produced polymers with poor morphology and/or had the tendency to foul the reactor during polymerization. Accordingly, vanadium based catalyst systems have not achieved widespread use in polymerization as have titanium or chromium based catalysts. The development of commercially useful supported vanadium polymerization catalysts have been particularly elusive despite the numerous advantages accompanying these systems, such as easier recovery and better handleability of the catalyst as well as a greater control over the shape and size of the polymer particle and the overall quality of the polymer particle thus produced. Continued research is aimed at producing a vanadium based catalyst system which has catalytic activity comparable to those normally associated with titanium based catalyst systems.

The activity of a catalyst is represented by the weight of product produced per unit weight of catalyst used. Accordingly, the activity of a polymerization catalyst is defined by the weight of polymer produced per unit weight of catalysts used to initiate the polymerization reaction. Those skilled in the art are quite aware of the fact that a highly active catalyst reduces the amount of catalyst required for the polymerization process. More importantly, however, this signifies a lower concentration of the catalyst in the final polymeric product which results in a higher purity polymeric product. Thus in the development and design of novel catalyst systems for polymerizing olefins, this property along with the catalyst's effect on the physical properties of the resultant polymer must be carefully considered.

One way of improving the activity of a polymerization catalyst without negatively affecting the physical characteristics of the polymer is to introduce so-called cocatalysts or activators to the solid catalyst component during the polymerization process. Typically, in vanadium based catalyst systems chlorocarbons such as carbon tetrachloride are used as a promoter to enhance the overall activity of the system. However, those skilled in the art are aware that chlorocarbons are highly toxic and in the atmosphere exposure to UV light causes the compound to decompose releasing chlorine radicals into the atmosphere. Thus, it would be highly advantageous to develop a novel cocatalyst which exhibits little or no toxicity to replace the use of chlorocarbon compounds.

Examples of the development of supported vanadium based catalyst systems include: U.S. Pat. No. 3,786,032 to Jennings et al. relates to a catalyst used to polymerize vinyl and vinylidene halides, the catalyst is formed from an inert solid matrix, vanadium compounds and an organo-zinc complexed with an oxime. The organo-zinc complex is added as an activator either immediately before or during the initial stages of polymerization.

U.S. Pat. No. 4,559,318 to Smith et al. discloses a vanadium dihalide complexed with an ether, such as tetrahydrofuran and a zinc compound. The solid catalyst is then reacted with an activator during polymerization. Suitable activators employed include compounds such as dibromomethane, bromochloromethane, 1,1,3-trichloro-trifluromethane, 1,2-dichlorotetrafluorethane and dichloro-difluoromethane.

U.S. Pat. No. 4,611,038 to Brunet al. discloses an olefin polymerization catalyst system prepared from a vanadium metal component, a porous support, and an organo-zinc compound; to yield the active solid hydrocarbon catalyst system, a controlled amount of prepolymerization takes place with this composition. One or more organometallic compounds of metals of groups I and II of the Periodic Table of the Elements, preferably a hydrocarbylaluminum and/or hydrocarbon magnesium compound may be added during polymerization to increase the activity of the resultant solid catalyst.

A more recent attempt to produce a high activity vanadium based catalyst composition which produces high density, high molecular weight alpha olefin polymers that have a relatively broad molecular weight distribution is described in U.S. Pat. No. 4,866,021. The catalyst system utilized therein incorporates supported vanadium, aluminum, and zinc compounds and further requires the presence of titanium, which component is not necessary in the practice of the present invention.

U.S. Pat. No. 4,250,287 to Matlack relates to a solid catalyst component useful for polymerizing 1-olefins. The catalyst component is composed of a titanium halide deposited on an anhydrous magnesium halide-support and an activator component composed of trialkylaluminum and an alkyl ester of an aromatic carboxylic acid. The productivity of the catalyst is increased by including a halosilane in the activator component.

U.S. Pat. No. 4,866,021 to Miro et al. provides a vanadium and a titanium-containing catalyst composition which produces high density, high molecular weight α-olefin polymers having a relatively broad molecular weight distribution. The catalyst component is produced by contacting a solid, porous carrier sequentially with a metal or a compound of a metal of Group IIB of the Periodic Chart of the Elements, e.g., a zinc compound, a halogen-containing aluminum compound, a vanadium compound and a titanium compound. The catalyst precursor is then combined with a suitable co-catalyst such as an alkyl aluminum compound and a halogenating agent. Suitable halogenated agents include methylene chloride, chloroform, carbon tetrachloride, dichlorosilane, trichlorosilane and silicon tetrachloride.

U.S. Pat. No. 4,831,000 to Miro is directed to a catalyst composition for the polymerization of olefins, particularly alpha-olefins. The composition is prepared by synthesizing a catalyst precursor and then combining it with a conventional catalyst activator. The precursor is synthesized by contacting a solid, porous carrier with an aluminum compound; contacting the resulting product with a mixture of vanadium and titanium compounds; contacting the product with an ether; and, pre-activating the product with a mixture of a halogenating agent and an aluminum compound. During polymerization, a halogenating agent may be used to obtain broad molecular weight distribution LLDPE and HDPE products. In another embodiment, the catalyst composition is used without a halogenating agent to obtain narrow molecular weight distribution HDPE and LLDPE products.

U.S. Pat. No. 4,912,074 to Miro, which is a continuation-in-part of U.S. Pat. No. 4,831,000 relates to a similar catalyst composition as U.S. Pat. No. 4,831,000; however, the pre-activating step has been omitted.

U.S. Pat. No. 4,972,033 to Miro relates to a catalyst composition for the polymerization of olefins. The composition is prepared by contacting a solid, porous carrier with an aluminum compound; contacting the resulting product with a mixture of vanadium and titanium compounds; contacting the product with an alkyl ether and, pre-activating the catalyst with a mixture of a halogenating agent and an aluminum compound. The catalyst is used without a halogenating agent in the polymerization medium to produce narrow molecular weight distribution HDPE and LLDPE products, or with a halogenating agent in the polymerization medium to produce broad molecular weight distribution LLDPE and HDPE products.

U.S. Pat. No. 5,006,618 to Miro, which is a divisional of U.S. Pat. No. 4,912,074 which was a continuation-in-part of U.S. Pat. No. 4,831,000, disclosed a catalyst composition for the polymerization of olefins, particularly alpha-olefins. The composition is prepared by contacting a solid, porous carrier with an aluminum compound; contacting the resulting product with a mixture of vanadium and titanium compounds; and, contacting the product with an ether. The catalyst composition is used with a conventional activator and, preferably, a halogenating agent in the polymerization medium to produce broad molecular weight distribution, high molecular weight HDPE or medium density, broad molecular weight distribution, high molecular weight resins which can be made into high strength films.

SUMMARY OF THE INVENTION

The present invention is directed to a novel halosilane cocatalyst component which when used in conjunction with an aluminum-containing cocatalyst provides enhanced catalytic activity of a vanadium based solid catalyst component in the polymerization of α-olefins. In addition to the enhancement in the catalytic activity obtained using the present catalyst system, the resultant polymer produced by the present invention exhibit improved physical properties compared with polymers produced by prior art vanadium based catalyst systems. Thus, the catalyst system of the instant invention represents an advance in the art in view of the combination of increased catalytic activity, i.e. yield of polymer produced, and enhanced physical properties of the polyolefin produced.

Furthermore, the use of halosilane as a cocatalyst component results in catalyst system whose activity is comparable to system where chlorocarbons are employed, however, they exhibit little or no toxicity compared to chlorocarbon compounds.

In accordance with the present invention, a catalyst system is provided which comprises a solid catalyst component and a halosilane cocatalyst component. The solid catalyst component of the present invention is the product formed by admixing a solid inorganic oxide, a Group III organometallic compound, a vanadium-containing compound and an organic reagent.

The organometallic compound may be one or more organometallic compounds having the structural formula $R_xMR'_yR''_z$ wherein M is a metal of Group III of the periodic table, R is an alkyl group containing 1 to 12 carbon atoms, R' and R'' are independently hydrogen, halide, alkyl and alkoxy groups containing from 1 to 12 carbon atoms, x is an integer from 1 to 3, and y and z are 0 or an integer from 1 to 2, the sum of which is not greater than $3-x$.

The vanadium-containing compound used in the present invention has the structural formula $V(OR)_x(O)_y(X^2)_z$ wherein $X^2$ is a halogen, R is a saturated hydrocarbon having from 1 to 18 carbon atoms, x is 0 or an integer from 1–5, y is 0 or 1, and $z=(5-x-2y)$ or 4 or 3 when $x=0$, $y=0$. Mixtures and/or intermixtures of these vanadium compounds may also be used in the practice of the present invention.

The organic reagent may vary depending on the desired molecular weight distribution of the resultant polymer product. Suitable organic reagents that may be added include alcohols, ethers, carbonates, amines, phosphorous compounds or dialcohols. Of these organic reagents, alcohols are most particularly preferred.

The alcohol employed in the present invention is any alcohol having from 1 to 18 carbon atoms, preferably n-alkanols having from 3 to 6 carbon atoms.

Optionally, other modifying compounds may also be incorporated into the admixture. The modifying compounds may be used to enhance or further control the activity of the catalytic system, the response to hydrogen during the polymerization reaction, and/or the molecular weight distribution of the polymer product.

The modifying compounds which may be employed by the present process include compounds having the structural formula $M(R^4)_dX^3_{3-d}$ where m is aluminum or boron, $X^3$ is a halogen, $R^4$ is a saturated hydrocarbon having from 1 to 12 carbon atoms and d is 0 or an integer from 1 to 3. Examples of suitable modifying compounds include boron alkyl halides, such as ethyl boron dichloride, which function as molecular weight regulating agents; aluminum halides and aluminum alkyl halides, such as diethyl aluminum chloride or ethyl aluminum dichloride, which function to enhance catalyst activity and polymer product properties.

Other modifying compounds that favorably affect or provide control over catalyst activity and/or polymer characteristics include magnesium compounds of the formula $MgR_e^5Y_{2-e}$ wherein $R^5$ is a saturated hydrocarbon having from 1 to 12 carbon atoms, Y is halogen or alkoxy compound having the formula $OR^6$ where $R^6$ is a saturated $C_1$ to $C_{12}$ hydrocarbon, or Y is a silyl amide having the formula $N(SiR_3^7)_2$ where $R^7$ is a saturated $C_1$ to $C_{12}$ hydrocarbon, and e is 0 or an integer from 1 to 2. Examples of these particular compounds include magnesium alkyl halides and magnesium alkyls, alkyl magnesium silyl amides and the like thereof.

In forming the solid catalyst component, the order of addition of the various compounds to the admixture is not critical. However, it is preferred that the addition of the various compounds be added in the order described hereinabove.

The above-obtained solid catalyst component is then interacted with an aluminum-containing first cocatalyst component and a halosilane second cocatalyst component during polymerization of an α-olefin. The aluminum-containing cocatalyst component are conventional aluminum cocatalyst well known in the art, e.g. aluminum alkyls.

The novel cocatalyst component which is employed by the present process is a halosilane compound having the structural formula $R_f^8SiX_g^3$ wherein $X^3$ is halogen; $R^8$ is hydrogen, alkoxy, aryloxy, silyoxy, alkyl, aryl or cycloalkyl; f is 0 or an integer from 1 to 3; and g is an integer from 1 to 4 with the proviso that the sum of f and g is 4.

In another aspect of the present invention, a process of the polymerization of α-olefins is disclosed. In this process at least one olefin is polymerized under olefin polymerization catalyst utilizing the catalyst system of the present invention, which includes the solid catalyst component of the present invention, an aluminum-containing cocatalyst component and a halosilane cocatalyst component.

DETAILED DESCRIPTION OF THE INVENTION

The preferred solid catalyst component utilized in the present catalyst system is prepared by initially contacting silica support with at least one organometallic compound at least one vanadium-containing compound and an alcohol.

The silica employed in the current catalyst system is preferably pure however, it may contain minor amounts of other inorganic oxides such as alumina, titania, zirconia, magnesia and mixtures thereof. In general, the silica support comprises at least 90%–99% by weight pure silica. In one preferred embodiment the silica is at least 99% pure.

The silica support utilized in the preparation of the vanadium based catalyst, is preferably a high surface area, high pore volume material defined by a surface area between 50m²/gm and about 500 m²/gm; a median particle size of about 20 microns to about 200 microns and a pore volume of about 0.5 cc/gm to about 3.0 cc/gm as determined by standard B.E.T. measurements.

It is a preferred embodiment of the invention that the silica support be pretreated prior to its use to remove some impurities or surface hydroxyl groups.

To cause effective removal of surface hydroxyl groups from the surface of the silica support, the silica may be calcined in an inert atmosphere at a temperature of at least 150° C. Preferably, calcination of the silica is performed in the temperature range from about 150° C. to about 650° C. in an inert gas atmosphere, i.e. nitrogen or argon.

Another method of removing surface hydroxy groups involves contacting the silica with a hexaalkyl disilazane or chlorosilanes as disclosed in U.S. Pat. No. 4,530,913 of Pullukat et al., for example. Of the hexaalkyl disilazanes useful in this application, hexamethyl disilazane, i.e., H.M.D.S., is particularly preferred.

The silica may also be pretreated by combining the calcination method and treatment with a hexalkyl disilazane. In this method, the sequence of pretreatment may be random; however, it is another preferred embodiment that the hexaalkyl disilazane treatment precede the calcination process.

The pretreated silica support, which can be at room temperature throughout the preparation process, is then slurried with a hydrocarbon solvent. Hydrocarbon solvents which are suitable for use in the present invention include any aliphatic or aromatic hydrocarbon solvent containing from 5 to 15 carbon atoms. In a preferred embodiment, aliphatic hydrocarbon solvents such as pentane, hexane, heptane and the like are used to form a slurry with the silica. Of these solvents, heptane is most preferred. In another preferred embodiment, the amount of silica slurried with heptane conforms to a ratio of about 3 to about 5 grams of silica for every 30 milliliters of solvent.

Prior to its use, the hydrocarbon solvent should be purified, e.g. by percolation through silica gel and/or molecular sieves to remove trace quantities of water, oxygen, polar compounds and other materials capable of adversely affecting the catalyst activity.

The silica, in slurry form, is contacted with the first of the solid catalyst forming compounds. Although the sequence in which the catalyst forming compounds are admixed is of no criticality, it is nevertheless preferred to contact the silica first with an organometallic compound. The organometallic compounds employed in the practice of the present invention are compounds having the structural formula:

$$R_xMR'_yR''_z$$

wherein M is a metal of Group IIIA of the periodic table, R is an alkyl group containing 1 to 12 carbon atoms, R' and R" are independently hydrogen, halide, and alkyl and alkoxy groups containing from 1 to 12 carbon atoms, x is an integer from 1 to 3, and y and z are 0 or an integer from 1 to 2, the sum of which is not greater than $3-x$.

The preferred organometallic compounds are those in which M is aluminum. Suitable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isopropenylaluminum, trihexylaluminum, trioctylaluminum, tridecylaluminum, tridodecylaluminum, etc.; the corresponding alkoxy compounds wherein one or two the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminumhydride, di-n-propylaluminumhydride, diisobutylaluminum hydride, etc.; and mixtures of such compounds.

Especially preferred aluminum compounds are the trialkylaluminums, particularly triethylaluminum and tri-n-hexyaluminum, which are advantageous to employ because of their cost, availability, and/or effectiveness.

The amount of organometallic compound added to the slurried silica, in terms of the amount of Group III metal present, is from about 0.3 to about 30 millimoles of Group III metal per gram of silica. Preferably, the amount is about 1.4 millimoles of metal per gram of silica. The reaction temperature at this contacting step can be at or about room temperature and the pressure can be at or about atmospheric. These reaction parameters may be utilized throughout the preparation of the solid catalyst component. Thus no special heating or cooling, and no pressurization or vacuum are necessary although these may be employed without causing any adverse effects to the solid catalyst component of the present invention.

The reaction time employed in the contacting step is from about 10 to about 120 minutes. More preferably, the admixing of the organometallic compound and the slurried silica occurs in a time period of about 30 minutes.

The resultant mixture is then contacting with a vanadium-containing compound having the structural formula:

$$V(OR)_x(O)_y(X^2)_z$$

wherein $X^2$ is a halogen; R is a saturated hydrocarbon having from 1 to 18 carbon atoms; $x=0$ or an integer from 1 to 5, $y=0$ or 1, and $z=(5-x-2y)$ or 4 or 3 when $x=0$, $y=0$. In a preferred embodiment of the instant invention the vanadium-containing compound having this formula is vanadium tetrachloride, vanadium trichloride, vanadyl chloride or vanadium isopropoxide.

Mixtures and intermixtures of vanadium-containing compounds exemplified by this formula mentioned hereinabove may also be utilized in the instant invention.

The amount of vanadium-containing compound added is from about 0.01 to about 10 millimoles per gram of silica; preferably about 0.1 millimoles per gram of silica. The reaction, normally with continuous stirring, is allowed to proceed for a time period of about 10 to about 120 minutes. After this time period, the solid catalyst component is in its most fundamental form and may be used without any further contacting steps. If no further compounds are to be introduced into the admixture, the reactant product can be dried with a nitrogen purge of about 100 ml/min at about 75° C. It should also be noted that all of the contacting steps described herein are carried out in the presence of an inert gas atmosphere, such as nitrogen or argon, thus, preventing any air or moisture coming into direct contact with the solid catalyst, which may adversely affect the activity of the resultant catalyst.

This reaction product is then reacted with an organic reagent. The organic reagent is employed herein to control the molecular weight distribution of the resultant polymeric product. Suitable organic reagents contemplated by the present invention include alcohols, esters, carbonates, amines, phosphorous compounds or dialcohols. Of these organic reagents, alcohols having from 1 to 18 carbon atoms are particularly preferred. The preferred alcohol is a n-alkanol having 3 to 6 carbon atoms. The most preferred n-alkanol is 2-methoxy ethanol. The amount of alcohol which is added to the reaction product is from about 0.01 to about 10 mmoles per gram of silica. More preferably, the amount is from about 0.1 to about 10 mmoles of alcohol per gram of support.

Although not essential, the presence of a modifying compound to enhance or control the polymer and/or catalytic properties is preferred when forming the solid catalyst component.

The modifying compound is represented by the general structural formula:

$$M(R^4)_d(X^3)_{3-d}$$

wherein M is aluminum or boron, $R^4$ represents a saturated hydrocarbon having from 1 to 12 carbon atoms, preferably a C2 saturated hydrocarbon, $X^3$ is halogen, preferably chlorine, and d is 0 or an integer from 1 to 3. Examples of suitable modifying compounds having this formula include diethyl aluminum chloride (DEAC), ethyl aluminum dichloride (EADC), ethyl boron dichloride, and boron trichloride.

Other modifying compounds which may be employed by the present invention are magnesium-containing compounds having the structural formula:

$$MgR_e^5Y_{2-e}$$

wherein $R^5$ is a saturated hydrocarbon having from 1 to 12 carbon atoms; Y is a halogen, or an alkoxy having the formula $OR^6$ where $R^6$ is a saturated $C_1$ to $C_{12}$ hydrocarbon or a silyl amide having the formula $N(SiR_3^7)_2$ where $R^7$ is a saturated hydrocarbon having from 1 to 12 carbon atoms, and e is 0 or an integer from 1 to 2. Examples of compounds which satisfy this criteria include dibutyl magnesium, butyl ethyl magnesium and butyl magnesium silyl amide.

Mixtures and intermixtures of modifying compounds may also be used by the present invention.

The amount of the modifying compound, when utilized, in terms of the amount of metal aluminum, boron, and/or magnesium present is from about 0.1 to about 3.0 millimoles per gram of silica. Most preferably, the amount is between about 0.5 to about 2.0 millimoles per gram of silica. The addition of the modifying compound may occur at about room temperature and at about atmospheric pressure, the attendant reaction being allowed to proceed for approximately thirty minutes before either the addition of the next catalyst component, if any, or the recovery of the reaction product by drying with nitrogen.

If one or more modifying compound(s) is utilized, no specific order of addition for these compounds to the reaction product admixture is required. Thus, for example, the modifying compounds may be introduced before or after the organometallic and/or vanadium component. The modifying compounds are, in any event, preferably introduced into the admixture as a solution in a non-polar hydrocarbon solvent. Alkanes, such as hexane or heptane, are preferred although cycloalkanes and aromatics may also be used. Mixtures of such solvents may also be provided.

Approximately 30 minutes after the addition of the final catalyst component to the admixture, the resulting reaction product is dried with a nitrogen purge at about 75° C. to recover the supported reaction product.

It should be appreciated that all the treatment steps in the formation of the catalyst of this invention, the contact of silica with organometallic compound, the vanadium-containing compound and optionally the modifying compound, involve contact between a solid, silica, and a liquid. This is because each of the compounds that are contacted with silica are liquids or are soluble in an inert hydrocarbon solvent under the conditions employed by the present process. As such, no ball-milling or other solid mixing is required. This expensive and difficult operation, usual in the formation of polymerization catalysts of the prior art, is thus eliminated. Those skilled in the art are aware, in the case where a hydrocarbon solvent is employed, that the solvent may be allowed to remain with the reaction mass or can be removed by decantation, filtration, evaporation, or the like.

Further observations regarding the above catalyst formation steps include the facts that the morphology of the polymer produced from this catalyst emulates the support; that the absence of any halogen in the support aids in keeping the halogen content of the polymer produced therefrom low; that the relatively low concentrations of vanadium on the silica support also tend to keep vanadium concentration at similarly low levels; that the preparation of the catalyst of the present invention is conducted at moderate temperature, preferably, in the range of between about 0° C. and 100° C.; and that even though this catalyst does not need an electron donor it is possible to use one or more of them if desired.

The solid catalyst component produced herein is then contacted under polymerization reaction conditions with a first cocatalyst component and a second cocatalyst component.

The first cocatalyst of the catalyst system is an aluminum-containing compound. The aluminum-containing compound is preferably an alkylaluminum-containing compound. Alkylaluminum-containing compounds suitable for the present process include trialkylaluminum, alkylaluminum halides, alkylaluminumhydrides or mixtures thereof. More preferably, the cocatalyst is a trialkylaluminum. Of the trialkylaluminums, triethylaluminum, triisobutylaluminum and tri-n-propylaluminum are most particularly preferred.

The second cocatalyst of the catalyst system is preferably at least one halosilane compound having the structural formula $R^8_f SiX^3_g$ wherein $X^3$ is a halogen $R^8$ is hydrogen, alkoxy, aryloxy, silyoxy, alkyl, aryl, cycloalkyl; f is an integer from 0 to 3; and g is an integer from 1 to 4 with the proviso that the sum of f and g is 4. It should be noted that other Group IVB elements of the Periodic Table of Elements, excluding carbon, are contemplated herein as a substitue for silicon.

Of the halosilanes contemplated by the present invention, trichlorosilane, silicon tetrachloride, and trimethylchlorosilane are particularly preferred.

The molar ratio of halosilane cocatalyst to the aluminum-containing cocatalyst is from 0.01 to about 100. More preferably, the molar ratio of halosilane cocatalyst to first cocatalyst component is from about 0.2 to about 5. Based on solid catalyst component, the molar ratio of aluminum cocatalyst:halosilane cocatalyst:vanadium is from about 1:1:1 to about 1000:1000:1. More preferably, the molar ratio is defined from about 10:10:1 to about 300:300:1.

Our invention may also be utilized in conjunction with the practice of copending and coassigned application Ser. No. 011,046 of Menon et al., filed Jan. 29, 1993 and application Ser. No. 010,737 of Menon et al., filed Jan. 29, 1993 concurrently filed of the same inventive entity and incorporated herein by reference. That is the invention can be used alone as described herein or in conjunction with the embodiments of the copending applications.

In still another aspect of the present invention a process for polymerizing an olefin is set forth. This process comprises polymerizing at least one olefin under olefin polymerization conditions in the presence of the catalyst system of the present invention. That is, in the presence of the solid catalyst, the first cocatalyst and the second cocatalyst of the instant invention.

Olefins suitable in this process include α-olefins containing from two to twelve carbon atoms such as ethylene, propylene, butene, pentene and the like.

In a particularly preferred embodiment of the present invention, the olefin polymerized is ethylene.

In this preferred embodiment, polymerization of ethylene occurs at a temperature in the range of between about 30° C. and 250° C. More preferably, the temperature of this reaction is in the range of about 60° C. and about 100° C. The pressure of the ethylene polymerization reaction is in the range of between about 100 psig and about 1000 psig, more preferably between about 300 psig and about 700 psig. In a preferred embodiment the ethylene polymerization occurs in the presence of hydrogen gas.

The resultant polymeric product obtained from the process is characterized as being essentially pure due to the low concentration of vanadium in the solid catalyst component. Furthermore, the polymeric product obtained from the instant invention has improved physical properties (i.e. M.I. value) compared with those obtained using prior art catalyst systems.

The following examples are given to illustrate the scope of this invention. Because these examples are given for illustrative purposes only, the invention embodied therein should not be limited thereto.

EXAMPLE I

Solid Catalyst Preparation

Into a 250 ml. three-necked round bottom flask, purged with nitrogen gas free of oxygen and moisture, was placed 18.2 g of HMDS treated silica. The reaction vessel was also equipped with a paddle stirrer, a stirring gland, a condenser and a bubbler. The silica utilized in this example was characterized by standard B.E.T. methods as having a surface area of 200 m²/g a median particle size of 50 microns, and a pore volume of 1.30 cc/g.

The silica was then slurried with 100 milliliters of purified heptane at room temperatures for approximately 5 minutes. Thereafter, the slurried silica is admixed with 12.8 mmoles of triethylaluminum. The reaction time employed for the addition of the organometallic compound to the slurried silica was approximately 30 minutes. Continuous stirring was maintained throughout this time period.

To this admixture, 1.8 mmoles of vanadium tetrachloride was added at ambient temperature and was allowed to react with the admixture for 30 minutes. Thereafter, 1.8 mmoles of 2-methoxyethanol were added to the resultant mixture and stirred for 30 minutes. After this period of contacting with the vanadium compound, the temperature of the reaction vessel was then raised to 75° C. and maintained at this temperature for 1 hour. The hydrocarbon solvent was removed during this drying process. After drying the mixture, the resultant solid product was a gray-colored, free-flowing, spherically-shaped solid catalyst component.

Polymerization of Ethylene

The solid catalyst component obtained above was then utilized in the polymerization of ethylene. That is, a 1 gallon Autoclave Engineers (Trademark) reactor was charged with 156 mg of the solid catalyst component. In addition, triethylaluminum (TEAL) and trimethylchlorosilane were introduced into the reaction vessel such that the molar ratio of TEAL: trimethylchlorosilane:vanadium was about 140:140:1. The ethylene polymerization reaction was then conducted at a total pressure of 550 psig at 93° C. in 1.5 L of isobutane slurry. A pressure drop of 30 psig of H2 from a 1000 ml vessel was added at the start of the polymerization process. Ethylene was fed on demand for 1 hour with continuous stirring.

The polymerization data for this reaction is summarized in Table I. The activity of the catalyst was determined to be 698.97 g of polyethylene per gram of catalyst. The melt index (M.I.) of the resultant polymer produced was 1.57.

EXAMPLE II

The solid catalyst component was prepared in accordance with the procedure described in Example I except that the halosilane cocatalyst component was (Me3SiO)3SiCl. The polymerization data using this catalyst system is also summarized in Table I. The activity of the catalyst used in polymerization of ethylene to polyethylene was determined to be 580.90 g/g. The resultant polymer produced by utilizing this catalyst system had a M.I. of 1.53.

EXAMPLE III

The solid catalyst component utilized in this experiment was prepared in accordance with Example I; however, during polymerization of ethylene, trichlorosilane was used as a cocatalyst component instead of trimethylchlorosilane. The results of this catalyst system appear in Table I. The catalyst system using this cocatalyst had a catalytic activity of 382.98 grams of polyethylene per gram of catalyst. The M.I. value of the resultant polymer was determined to be 1.88.

EXAMPLE IV

The solid catalyst component was prepared in accordance with the procedure of Example I; however, silicon tetrachloride was used as the cocatalyst component. The results of this particular catalyst system are summarized in Table I. The activity of the resultant catalyst using SICl4 as a cocatalyst component was 80.27 of product per gram of catalyst.

EXAMPLE V

The solid vanadium based catalyst component was prepared in accordance with the procedure set forth in Example I. During the polymerization process, the cocatalyst employed was (t-Bu)2SiCl2. The results of this catalyst system appear in Table I. The activity of the catalyst was determined to be 73.22 grams of polyethylene per gram of catalyst.

COMPARATIVE EXAMPLE I

The solid catalyst component in this experiment was prepared in a similar manner as the solid catalyst component of Example I. Unlike the previous example however, no halosilane cocatalyst as set forth hereinabove was utilized during polymerization of ethylene. The activity of the catalyst system which utilized no halosilane cocatalyst was 40.89 grams of polyethylene per gram of catalyst. The activity of this catalyst system is lower compared with the catalyst systems which used a halosilane cocatalyst component. Furthermore, the M.I. value of polymers produced from catalysts system which employed the novel cocatalyst component were higher than those that did not use the novel component.

TABLE I

| Example | Halosilane | Catalytic Activity s/s | M.I. |
| --- | --- | --- | --- |
| 1 | Me3SiCl | 698.97 | 1.57 |
| 2 | (Me3SiO)3SiCl | 580.90 | 1.53 |
| 3 | HSiCl3 | 382.98 | 1.88 |
| 4 | SiCl4 | 80.27 | —<.1 |
| 5 | (t-Bu)2SiCl2 | 73.22 | —<.1 |
| CE1 | None | 40.89 | —<.1 |

What is claimed:

1. An improved catalyst system for polymerizing α-olefins consisting essentially of a silica supported vanadium based solid catalyst component prepared by the steps of:
   (a) pretreating silica support to remove surface hydroxyl groups;
   (b) slurrying said pretreated silica with a hydrocarbon solvent;
   (c) contacting said slurried silica with an organometallic compound having the formula:

$R_xMR'_yR''_z$ 

wherein M is a metal of Group IIIA of the Periodic Table of Elements, R is an alkyl group containing 1 to 12 carbon atoms, R' and R" are independently hydrogen, halide, alkyl or alkoxy groups containing from 1 to 12 carbon atoms, x is an integer from 1 to 3, and y and z are 0 or an integer from 1 to 2, the sum of which is not greater than 3−x;
   (d) contacting said product of step (c) with a vanadium compound having the formula:

$V(OR)_x(O)_y(X^2)_z$ 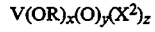

wherein $X^2$ is a halogen, R is a saturated hydrocarbon having from 1 to about 18 carbon atoms, x=0 or an integer from 1 to 5, y=0 or 1, and z=(5−x−2y) or 4 or 3 when x=0, y=0, or mixtures of such vanadium compounds;
   (e) reacting said product of step (d) with an organic reagent selected from the group consisting of alcohols, ethers, carbonates, amines, and phosphorous compounds; and
   (f) adding an alkylaluminum first cocatalyst component, and at least one halosilane second cocatalyst component having the formula $R_f^8 SiX_g^3$ where $X^3$ is halogen; $R^8$ is hydrogen, alkoxy, alkyl, aryl, silyoxy or cycloalkyl; f is 0 or an integer from 1 to 3, and g is an integer from 1 to 4 with the proviso that the sum of f and g is 4, to the silica supported vanadium based solid catalyst component during polymerization of said α-olefin.

2. The catalyst system of claim 1 wherein the halosilane is selected from the group consisting of trimethylchlorosilane, silicon tetrachloride, and trichlorosilane.

3. The catalyst system of claim 1 wherein the alkylaluminum compound is selected from the group consisting of trialkylaluminum, alkylaluminum halide, alkyl aluminum hydride and mixtures thereof.

4. The catalyst system of claim 3 wherein the aluminum-containing compound is triethylaluminum.

5. The catalyst system of claim 1 wherein the aluminum-containing compound and the halosilane compound are added to the solid catalyst in a molar ratio of about 1:1:1 to about 1000:1000:1 based on aluminum:-halosilane:solid catalyst.

6. The catalyst system of claim 1 wherein the organic reagent is an alcohol.

7. The catalyst system of claim 6 wherein the alcohol contains from 1 to 18 carbon atoms.

8. The catalyst system of claim 7 wherein the alcohol is a n-alcohol having from 3 to 6 carbon atoms.

9. The catalyst system of claim 8 wherein the alcohol is 2-methoxy ethanol.

10. The catalyst system of claim 1 wherein said solid catalyst further comprises: a modifying compound having the structural formula $$M(R^4)_d X^3_{3-d}$$

wherein M is Al or B, $X^3$ is a halogen, $R^4$ is a saturated hydrocarbon having from 2 to about 12 carbon atoms and d is 0 or an integer from 1 to 3 or $$Mg_e R^5 Y_{2-e}$$

wherein $R^5$ is a saturated hydrocarbon having from 1 to about 12 carbon atoms, Y is a halogen or an alkoxy having the formula $OR^6$ where $R^6$ is a saturated hydrocarbon having from 2 to about 12 carbon atoms, or a silyl amide having the formula $N(SiR_3^7)_2$ where $R^7$ is a saturated hydrocarbon having from 2 to about 12 carbon atoms, and e is 0 or an integer from 1 to 2; or mixtures of such modifying compounds.

11. The catalyst system of claim 1 wherein said organometallic compound is an aluminum-containing compound is an alkylaluminum compound selected from the group consisting of trialkylaluminum, alkylaluminum halide and alkylaluminum hydride.

12. The catalyst system of claim 11 wherein the aluminum-containing compound is triethylaluminum or triisobutylaluminum.

13. The catalyst system of claim 1 wherein said vanadium compound is $VCl_4$, $VCl_3$, $VOCl_3$, $VO(i-OC_3H_7)_3$ or mixtures thereof.

14. The catalyst system of claim 1 wherein the amount of organometallic compound is from about 0.3 to about 3.0 millimoles per gram of silica.

15. The catalyst system of claim 1 wherein the amount of vanadium compound is about 0.01 to about 10 millimoles per gram of silica.

16. The catalyst system of claim 12 wherein the amount of alcohol is about 0.01 to about 10 millimoles per gram of silica.

* * * * *